No. 698,899. Patented Apr. 29, 1902.
F. BOYER.
APPARATUS FOR THE MANUFACTURE OF KNOT STITCH CARPETS.
(Application filed July 27, 1900.)

(No Model.) 6 Sheets—Sheet 1.

WITNESSES:
Fred White
Thomas F. Wallace

INVENTOR:
Fernand Boyer,
By his Attorneys:

No. 698,899. Patented Apr. 29, 1902.
F. BOYER.
APPARATUS FOR THE MANUFACTURE OF KNOT STITCH CARPETS.
(Application filed July 27, 1900.)
(No Model.) 6 Sheets—Sheet 2.

WITNESSES:
Fred White
Thomas F. Wallace

INVENTOR:
Fernand Boyer,
By his Attorneys:

No. 698,899. Patented Apr. 29, 1902.
F. BOYER.
APPARATUS FOR THE MANUFACTURE OF KNOT STITCH CARPETS.
(Application filed July 27, 1900.)
(No Model.) 6 Sheets—Sheet 3.

WITNESSES:
Fred White
Thomas F. Wallace

INVENTOR:
Fernand Boyer,
By his Attorneys:

No. 698,899. Patented Apr. 29, 1902.
F. BOYER.
APPARATUS FOR THE MANUFACTURE OF KNOT STITCH CARPETS.
(Application filed July 27, 1900.)
(No Model.) 6 Sheets—Sheet 4.

Fig. 4.

WITNESSES:
Fred White
Thomas F. Wallace

INVENTOR:
Fernand Boyer,
By his Attorneys:
Arthur C. Fraser

THE NORRIS PETERS CO., PHOTO-LITHO., WASHINGTON, D. C.

No. 698,899. Patented Apr. 29, 1902.
F. BOYER.
APPARATUS FOR THE MANUFACTURE OF KNOT STITCH CARPETS.
(Application filed July 27, 1900.)
(No Model.) 6 Sheets—Sheet 6.

WITNESSES: INVENTOR:
Fred White Fernand Boyer,
Thomas F. Wallace By his Attorneys:

UNITED STATES PATENT OFFICE.

FERNAND BOYER, OF PARIS, FRANCE.

APPARATUS FOR THE MANUFACTURE OF KNOT-STITCH CARPETS.

SPECIFICATION forming part of Letters Patent No. 698,899, dated April 29, 1902.

Application filed July 27, 1900. Serial No. 25,004. (No model.)

*To all whom it may concern:*

Be it known that I, FERNAND BOYER, manufacturer, of 71 Rue de Richelieu, Paris, in the Republic of France, have invented Improvements in Apparatus for the Manufacture of Knot-Stitch Carpets; and I, the said FERNAND BOYER, do hereby declare the nature of the said invention and in what manner the same is to be performed to be particularly described and ascertained in and by the following statement thereof—that is to say:

This invention relates to a novel loom for the manufacture of knot-stitch carpets in which the work of the operator who makes the pile-thread loops is replaced by an operation similar to that of the needles of the Swiss embroidery-machine. The loom comprises two carriages bearing clips, which are moved horizontally one in front of the other and which successively carry the needles in which the yarn is threaded from the front toward the back and from the back toward the front from one side to the other of the fabric through the ground-warps. A vertical frame carries the warp-beams, between which are stretched the ground warp-threads of the fabric to be made. Between these warp-threads the needles, moved by the horizontal carriages, cause the threads for forming the pile of the carpet to pass in a path the effect of which is to form for each loop a perfectly-knotted stitch similar to that which the workman has heretofore made by hand. The clip-carriers move over fixed guides and the needles always follow the same path in the space. To allow the pile-threads to properly twine around the ground-warps, the frame carrying the beams is designed to move laterally from right to left at intervals of one or two threads, according to requirements. The loop being formed, it is cut in order to form the pile.

The accompanying drawings represent my new knot-stitch loom.

Fig. 4ª is an enlargement of a portion of Fig. 4.

The frame 1 carries at its base grooved rollers 2, which run upon guides 3 of circular section in order to cause the necessary lateral movements.

The carriages 4, carrying the clips 5, are placed in front and behind the ground-warps. They are provided with rollers 6, running upon fixed guides 7 at each side of the loom.

Figure 1:
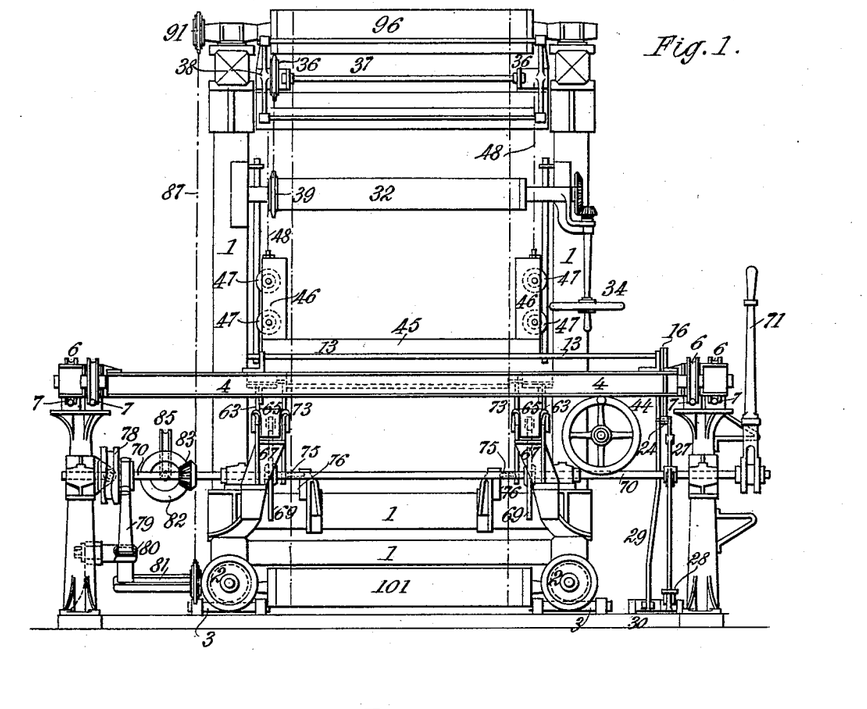
Figure 1 is a front elevation.
Figure 2:
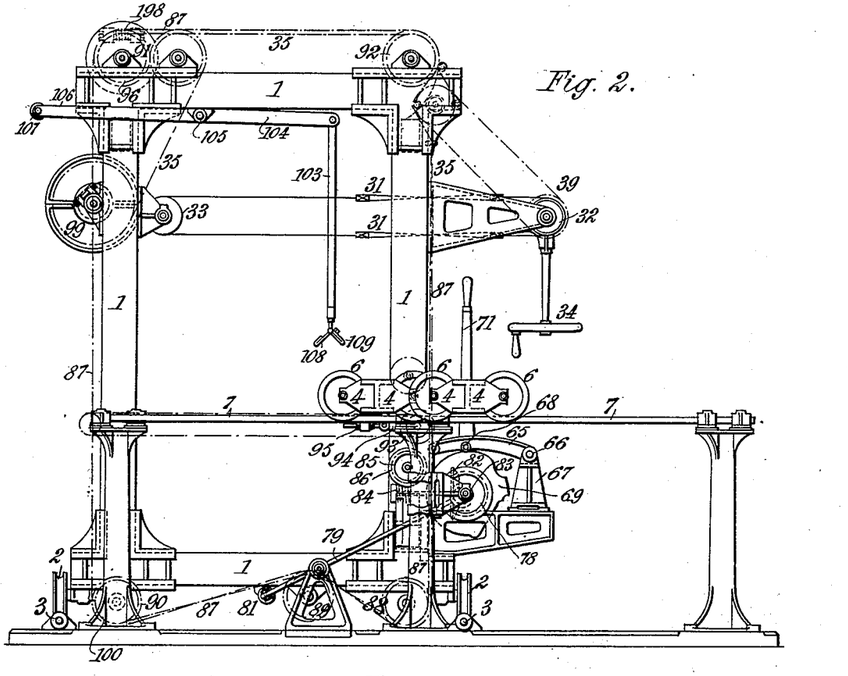
Figs. 2 and 3 are respectively left and right hand side views.
Figure 3:
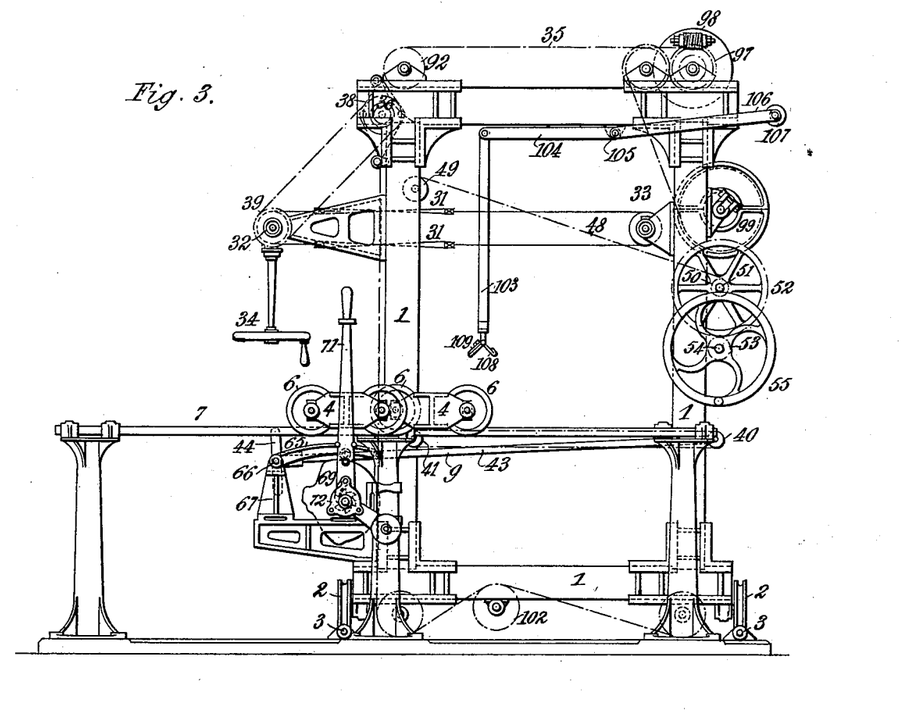
Figures 4, 12, 13, 14, 15, 16, 17, 18, 19, 20, 21, 22, 23, 24, 25, 26, 27:
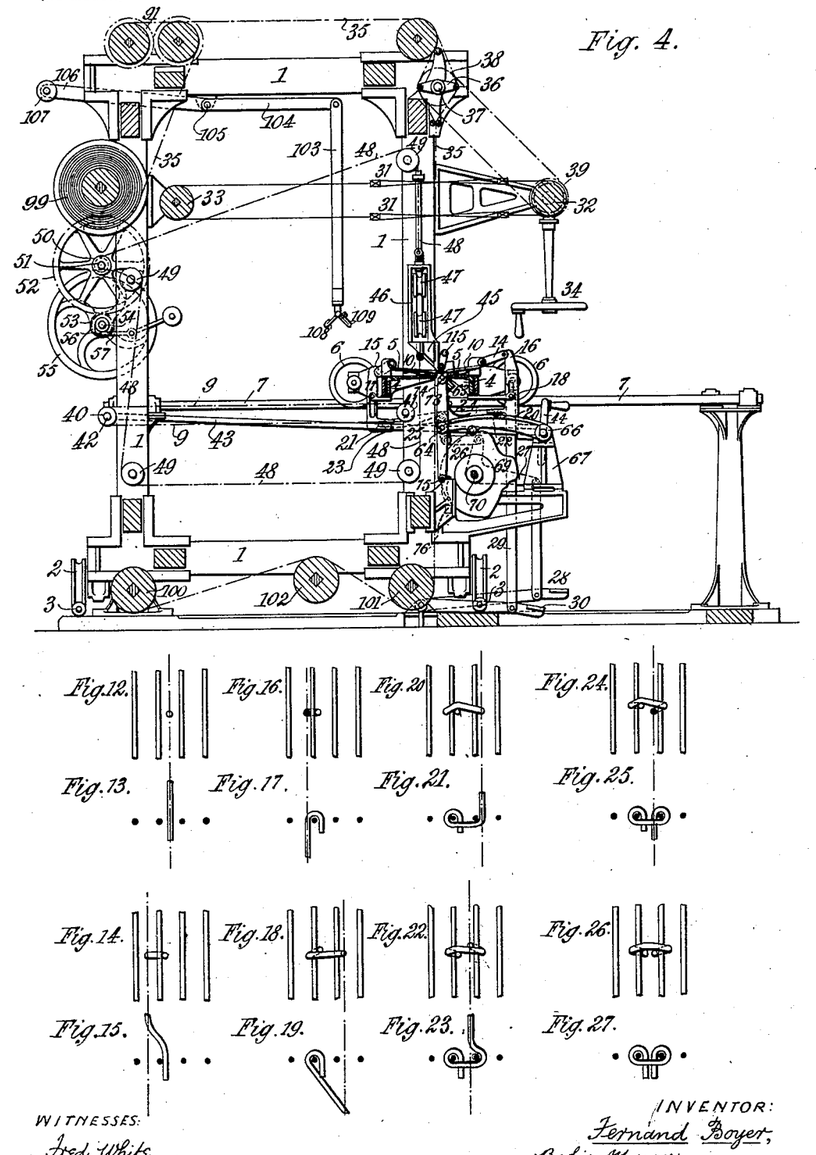
Fig. 4 is a vertical section.
Figs. 12 to 27, inclusive, show the successive steps in the formation of the knot-stitch.
Figure 4A:
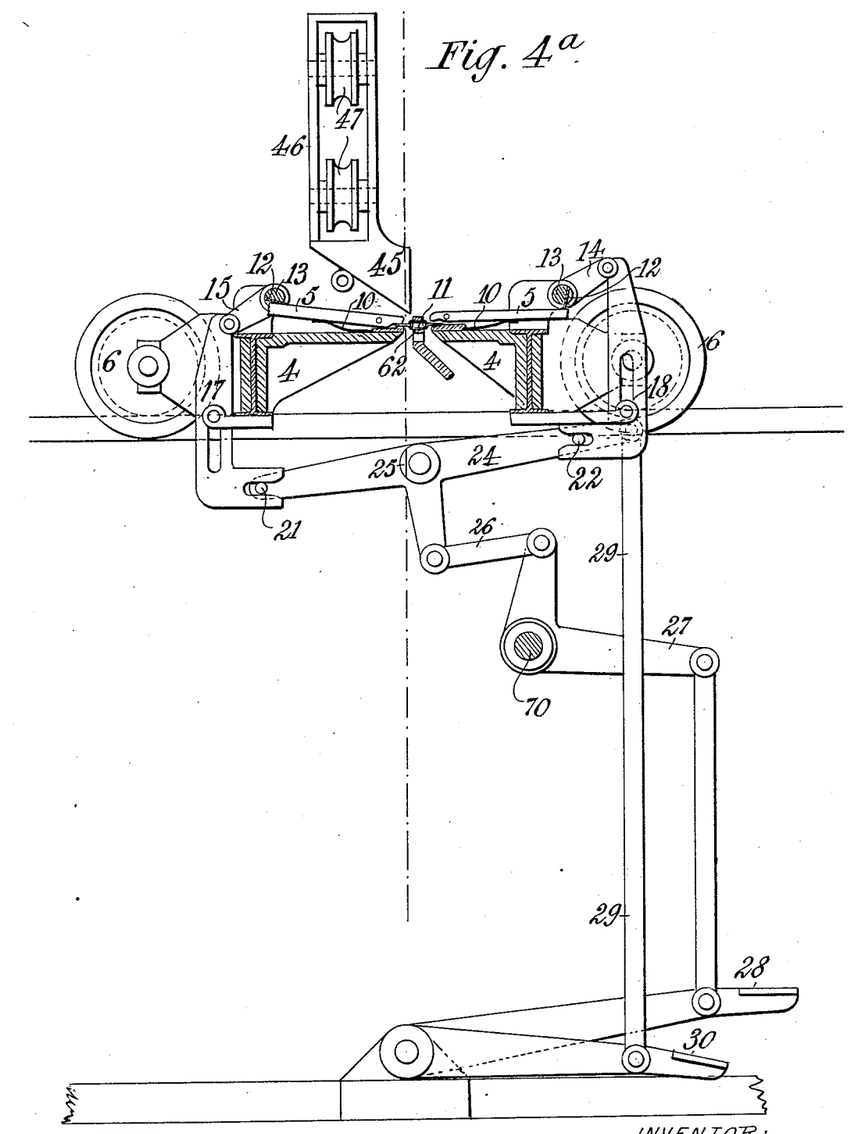

The clips 5, pivoted at 8 upon their respective carriages, are provided with pressure-springs 10, and the needles 11 are held by one of their points upon one carriage or the other, as will be hereinafter explained. The needles 11 are preferably shaped as shown in Fig. 4ª, with an elongated eye at the center for carrying the pile-thread. The tails of the clips are lowered to free the needles by means of the following arrangement: A flat bar 12 is carried on a shaft 13 above the row of clips of each carriage. At one of their ends the shafts 13 are provided with cranks 14 and 15, jointed to arms 16 and 17, guided at 18 and 19. The lower ends of the arms 16 and 17 are made, as shown in Fig. 4, in the form of jaws 20 and 21, the mouths of which are turned aside from the ground-warps. When the two carriages are moved toward one another near the fabric, the jaws 20 and 21 embrace the pins 22 and 23 on the ends of a lever 24, rocking on a pivot 25 and connected by a link 26 to a bell-crank lever 27, connected to a treadle 28. The lever 24 is also connected by a rod 29 to a treadle 30. The two treadles are combined in such a manner that one rises while the other is descending at the moment that the lever 24 is caused to rock, in order to turn one or the other of the shafts 13 for the purpose of opening one or the other of the groups of clips.

The healds 31 are horizontal. They pass over two rollers 32 and 33, one of which receives motion from bevel-gear actuated by a hand-wheel 34.

To allow the easy passage of the shuttle by hand when throwing the weft, the warps are slackened by means of the following arrangement: The ground warp-threads 35 pass in pairs over transverse bars mounted on a frame 36, pivoted at the upper part of the loom-frame upon the shaft 37, which carries a toothed wheel 38, connected by an endless chain with a second wheel 39, keyed upon the same shaft as the heald-roller 32. The warp-threads therefore, where they pass over the frame 36, assume a diamond shape when they are at rest. On the movement of the healds the frame turns a quarter of a revolution upon its axis, and the threads, slightly slackening, allow the shed to be opened. The front carriage, carrying the clips, is moved directly by hand by the workman, and the rear carriage is actuated by two chains 9, passing over chain-wheels 40 at the right and left hand sides at the back of the loom, and wheels 41 at the front of the frame. The wheels 40 are keyed upon the shaft 42, connected by bevel-gearing to a shaft 43, which carries a hand-wheel 44, actuated in either direction, according as it is required to advance or withdraw the carriage.

The batten is constructed of reeds 45, mounted upon two supports 46, provided with rollers 47, running on two fixed guides toward the interior of the frame along the front uprights. The traveling supports 46 are attached to endless chains 48, passing over rollers 49 and over small wheels 50, which, being keyed upon the shaft 51, receive a rotating movement in either direction through the medium of a toothed wheel 52, gearing with a pinion 53, keyed upon the shaft 54 of a hand-wheel 55. A tappet 56, held by a pawl 57, allows of keeping the batten in its raised position during the formation of the stitch.

Figure 6:
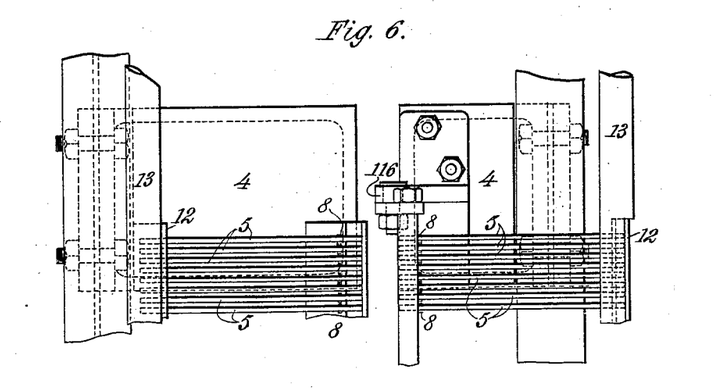
Fig. 6 is a plan of Fig. 5.
Figure 7:
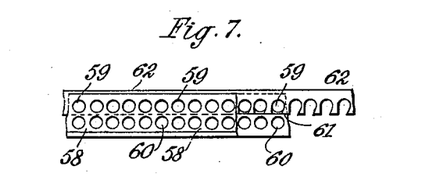
Figs. 7 and 8 are a side view and edge view, respectively, of the tube-carrier.
Figure 8:
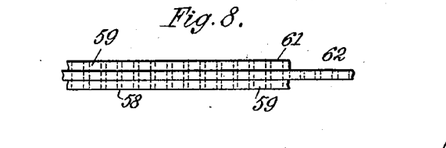

I provide a device which I call a "tube-carrier," arranged to insure the direction of the needles between the ground warp-threads. It is constructed, as shown in the detailed views Figs. 5 and 6 and the separate views Figs. 7 and 8, of a double-grooved plate 58, having two rows of holes 59 and 60, placed exactly over one another in pairs. In the groove 61, which divides the cylindrical holes of the upper row in two, can slide a rack-bar 62, having teeth cut like those of a saw. This bar is moved at the required moment, as will be hereinafter explained, in the formation of the stitch in order to grip the threads in the holes and hold the ends during the movement of the needles.

Figure 9:
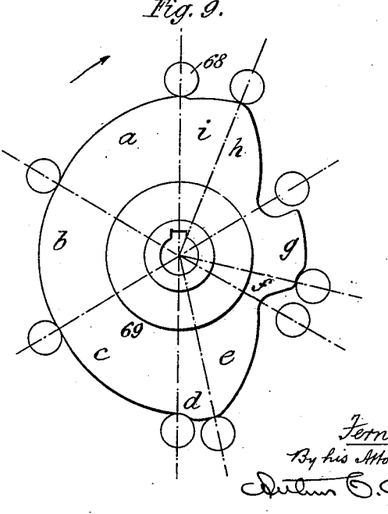
Fig. 9 is an enlarged view of the cam, showing the effect of its various positions.

The perforated plate 58 is mounted upon two levers 63, which are jointed at 64 to levers 65, which are themselves jointed at 66 to the brackets 67 and provided with rollers 68, on which act twin cams 69, keyed upon the main shaft 70, having an intermittent rotary motion communicated to it by means of a hand-lever 71, which acts upon a ratchet-and-pawl arrangement 72, causing the cam-shaft 70 to turn one-sixth of a revolution each time. Each lever 63 also actuates a second vertical lever 73. The two levers 73 are designed to support a counter-slay 74 for guiding and holding the warp-threads during the formation of the row of stitches. It is necessary to keep it back during the locking of the stitches by means of the batten. To this end each lever 73 carries at its lower part a roller 75, which runs upon a fixed cam 76. A spring 77 tends to cause it to rock in order to disengage the counter-slay from the vertical warps. One of the two cams 69 is shown drawn to a larger scale in Fig. 9. On this figure the relative positions of the roller 68 of the corresponding lever 65 are illustrated. Thus supposing the roller to recede more or less from the axis of the cam, the movements of the lever which carries it, and consequently the movements of the hanging levers 73 and 63, can be noted. The shaft 70 also carries a sliding grooved cam 78, operating upon the end of a lever 79, pivoted at a fixed point 80 and jointed by means of a link 81 to the loom-frame. The shape of this cam 78 is such that during the intermittent movement of the shaft 70 it moves laterally, carrying with it the lever 79 in its movements and causing the right and left hand movements of the frame, and consequently of the fabric, with relation to the needles in order to cause the latter to pass through at the required places for the purpose of effecting the different stages in the formation of the stitch. The shaft 70 also actuates a bevel-wheel 82 through the bevel-pinion 83. Upon the shaft of this wheel 82 is keyed a worm 84, driving a worm-wheel 85, the shaft of which carries a chain-wheel 86, over which passes an endless chain 87, passing over chain-wheels 88, 89, 90, 91, and 92 and a tension-wheel 93, the position of which is altered by means of a roller 94, carried on a screw adjusted by means of a nut 95. This chain, by means of the wheel 91, drives a wheel 96, provided with a regulating arrangement, by a toothed wheel 97 and worm 98, which allows the proper unwinding of the warps during the advance of the fabric. These warps are fed from a beam 99 and the fabric formed is wound upon a beam 100 after passing over the rollers 101 and 102. The beam 100 is also operated by the chain 87, which passes over a toothed wheel with which its shaft is provided.

Figure 10:
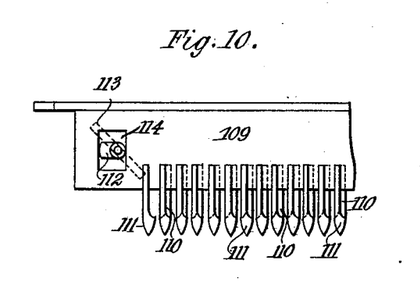
Figs. 10 and 11 show different positions of the hooks for giving the desired tension.

To give the required tension to the needle-threads, I arrange a catch carried by the two pendent rods 103, jointed to the ends of the levers 104 on the shaft 105, actuated by the lateral levers 106, provided with the common handle 107. The catch is represented in two positions at Figs. 10 and 11. It comprises two plates 108 and 109, one of which is jointed at its two ends to the rods 103 and the other of which is adapted to slide over the former. The plate 108 is provided with fixed hooks 110, and the movable plate is provided with hooks 111, turned in the reverse direction to the other hooks. In the position shown in Fig. 10 the hooks are superposed in pairs and present no impediment to the movement of the whole of the needles through the threads when the gripper is passed through them, the needles being drawn backward. The hooks being below the threads, if the movable plate 109 be shifted by means of a key-bit 112, operated by a handle 113 and moving in a slot 114 in the movable plate, the latter will take the position Fig. 11 and the needle-threads will be engaged in the openings formed by the superposed hooks, which slightly overlap one another. The whole can then be lifted in order to put the threads held by the hook-gripper more or less in tension.

Figure 5:
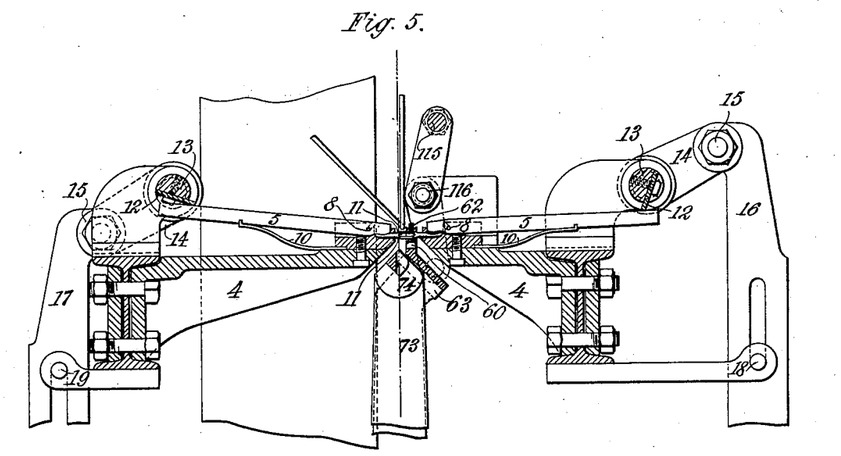
Fig. 5 is a section, drawn to a larger scale, of the mechanism for forming the stitch.

A safety-bar 115, pivoted at 116 to the two ends of the clip-carriages, allows of preventing the needles from escaping when tension is applied, when it is turned down, as shown by the dotted lines in Fig. 5. In this position, in fact, the thread coming from the front is brought back to the front underneath the carriage and tends to press the needle down below the clip which holds it.

Having thus described the construction of the principal parts of the loom, I will now explain the formation of the stitch.

Figure 11:
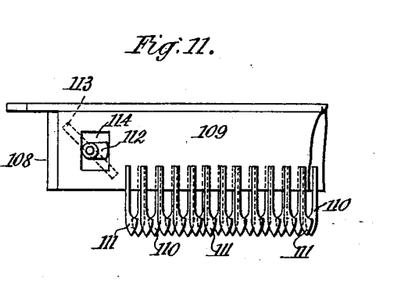

The front carriage bearing the needles being brought back to the front and the needles filled with thread by any known means suitable for the purpose, such as a series of bobbins, the carriage is moved forward and the needles pass through the upper holes 59 of the tube-carrier in the middle of the stitch, Figs. 12 and 13. The rear points of the needles are allowed to be gripped by the clips of the rear carriage at the same time that the front points are released by operating the treadle 30, which acts upon the lever 24, which causes the two shafts carrying the pressure-plates 12 to turn in the proper direction. The carriage is drawn backward by operating the hand-wheel 44, which actuates by means of the described mechanism the endless chains 9, attached to the foot of the rear carriage, which moves back as far as the end of the needle-thread. The threads are gripped in the tube-carriers 58 by the movement of the rack, having saw-teeth 62, which is bolted in this position. The tube-carrier is then lowered about thirty millimeters and the frame 1 is moved toward the right hand to allow, the moment after, of piercing at the left of the stitch, Figs. 14 and 15. These two latter operations are effected by the workman pulling the side lever 71, which actuates the cam-shaft 69, toward him. These latter turn one-sixth of a revolution, (angle $a$, Fig. 9.) The rollers 68 slightly descend and allow the levers 65 to again descend, which levers move the levers 63 and 73, to which are respectively fixed the counter-slay 74 and the tube-carrier 58. At the same time the cam 78, which is adapted to move in the longitudinal direction of the main shaft 70, while revolving with it, bears upon a fixed roller which enters its groove and moves toward the left hand, moving with it the lever connected to the frame 1. The carriage is brought back in order to pass through the warps. The second treadle 28 is pressed down in order to free the needles from the clips of the rear carriage, and cause them to be gripped by those of the front carriage, which is then caused to move back. The operation is illustrated by Figs. 16 and 17. The complete movement toward the left hand of the frame is effected the whole width of the stitch in order to pierce on the right hand at the moment of the return of the front carriage toward the rear, Figs. 18 and 19. The movement is effected by means of the lever 71, which causes a sixth of a revolution of the shaft 70, of the cams 79, (angle $b$, Fig. 9.) The levers 63 of the tube-carrier and 73 of the counter-slay remain motionless; but the cam 78, actuating the lever 79, causes the required movement of the frame 1. The front carriage is brought back to its starting-point in order to cause the needles to pass through the ground-warps. The treadle 30 is again actuated to effect the movement of the clips, and the rear carriage moves back, drawing with it the needles, Figs. 20 and 21. The hook-gripper 108 is then caused to descend by hand, and it enters the woolen yarn of the needles. The gripper is raised after having operated the hooks, as represented in Fig. 11. The woolen threads are then placed in tension in order to lock the loops around their respective warps. The lever 71 is then operated, which causes the cams 69 to turn to the angle $c$, Fig. 9, to raise the tube-carrier the distance comprised between the two rows of holes, the lower of these coming to the level of the plane of the needles. At the same time the sliding cam 78 causes the frame 1 to move toward the right hand to afterward pierce through the middle of the stitch, Figs. 22 and 23, the rear carriage is brought back toward the fabric. The needles pass through and are gripped by the clips of the front carriage at the same time that they are released by those of the rear carriage. A slight backward movement of the front carriage is produced to allow of lowering the safety-bar which brings back the threads below the needles, preventing the latter from escaping from their clips when the tension is applied. The tube-carrier is engaged with the batten-slay by being bolted thereto. By means of the lever 71 the cams 69 are caused to turn to the angle $d$. The front carriage is moved back to effect the tension of the yarn, Figs. 24 and 25. The cams 69 are again turned to the angle $e$. In order to disengage the rollers 68, the tube-carrying levers 63 and slay-carrying levers 73 are disengaged from the cams to allow the free descent of the stitch and its tension. Two strokes of the batten are then given by means of the hand-wheel 55, which acts upon the chain 48, as hereinbefore explained. During this time the tension is maintained, so as to compel the stitch to pass twice over the warp-threads in order to secure the knot, Figs. 26 and 27. The wool yarn is cut by hand or by any known mechanism suitable for the purpose, and the rack having saw-teeth is released. The tube-carrier is ungeared and disengaged by giving a sixth of a revolution to the shaft 70 through the medium of the lever 71, (angles $f$ and $g$, Fig. 9.) The tube-carrier and the counter-slay are again raised as far as the batten-slay, (one-sixth of a revolution of the shaft 70, angles $h$ and $i$.) By this means the tube-carrier is caused to redescend until the upper holes come opposite the path of the needles. The fixed side cams at this moment bring back the tube-carrier to its normal position and reengage the counter-slay in the warp for the following stitch. The movement of the healds 31 is effected by means of the hand-wheel 34 in order to throw two wefts, and a stroke of the batten is given. The loom is then ready for putting in a fresh row of stitches.

The knot-stitch loom constructed as hereinbefore described will not admit of making carpets of various designs. In fact, each of the needles can only be filled with a uniform color. The result is that if only one loom be employed it is only possible to obtain a very limited number of effects, such as carpets with plain grounds and with borders, carpets with longitudinal stripes, (or transverse, according to the needles which form the stitches,) or carpets with check-patterns, and also, by increasing the number of needles for a given number of ground-warps, carpets with stripes of zigzag or Grecian-key form. In the latter case the table of the needle-carriages can be moved at the required moments, so as to place the end needles in and out of action at the required moments, the colors being conveniently distributed over all the row of needles. It is, however, necessary that the needlefuls of thread carried by the needles which are constantly working during the manufacture of the carpet should be of the same length. Those carried by the end needles near the edges of the fabric can be shorter in a proportion determined by the requirements of the manufacture.

In order to allow of making variously-colored carpets, I employ the following arrangement: If the needlefuls used are of sufficient length to make, for example, fifteen stitches each before being exhausted, I place fifteen looms side by side. The needle-carriages are arranged to be successively transported from one loom to another and to thus act for forming the fabric upon the various successive looms, each row of needles gradually exhausting its thread in forming a row of stitches, which are reproduced in the same order upon each of the different looms, these stitches being of any suitable colors in the same row. By providing another row of needles carrying various threads suitable to the colors to be produced upon each second row of stitches of the carpets the same effects can be produced upon the fabrics when the said second rows of stitches are put in as by the different juxtaposed looms. In this manner a diversity of colors can be employed, allowing of producing any suitable designs without the aid of a mechanical jacquard. The result obtained will be the same as that produced in the manufacture of knot-stitch carpets by hand of the kind known as "Savonnerie."

Having now particularly described and ascertained the nature of my said invention and in what manner the same is to be performed, I declare that what I claim is—

1. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, and a fixed frame over which said carriages move, the frame which carries the ground warp-threads being moved successively the space of two threads or two intervals according to the path which the needle is to take with relation to the fabric.

2. In a knot-stitch loom for the mechanical manufacture of knot-stitch carpets, a pair of carriages, a series of spring-closed needle-clips supported on each carriage, said clips having tails for opening them, a longitudinal bar placed above each clip-supporting carriage and pivoted at the two ends of the carriage and adapted to press on the tails of all the clips for releasing the needles, and means for reversing this movement for the two carriages, the gripping operation of one being effected while the releasing operation of the other is taking place and at the moment when the needles are in the ground-warps.

3. In a knot-stitch loom for the mechanical manufacture of knot-stitch carpets, a pair of carriages, a series of spring-closed needle-clips supported on each carriage, a longitudinal bar adapted to open the clips of each carriage, a lever pivoted at an intermediate point, each of the ends of the said lever engaging one of the bars which actuate the clips, and pedals for swinging said lever in opposite directions, whereby when said carriages approach one another the needles may be gripped by one and released by the other.

4. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation with the fabric, a bar having two rows of exactly-superposed holes, the said bar serving to guide the needles, and means whereby it may be caused to rise or descend at intervals between two rows of holes in order to prevent the needles in their return movement to the middle of the two warp-threads forming the stitch, from piercing the length of pile-thread already engaged between the two ground warp-threads.

5. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, a bar having two rows of exactly-superposed holes, the said bar serving to guide the needles, means whereby it may be caused to rise or descend at intervals between two rows of holes in order to prevent the needles in their return movement to the middle of the two warp-threads forming the stitch, from piercing the length of pile-thread already engaged between the two ground warp-threads, a counter-slay guiding the pile warp-threads below the passage of the needles, and means whereby it may be caused to retire, together with said perforated bar, when the locking of the stitch upon the face of the fabric takes place.

6. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, and a vertically-moving batten, an endless chain for operating said batten, gearing for driving said chain, and a hand-wheel controlling said gearing.

7. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, horizontally-moving healds, and mechanism designed to slightly slacken the ground-warps on the opening of the shed for the purpose of facilitating the passage of the shuttle.

8. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, and a clip for lifting the needle-threads for the purpose of giving a slight tension to the said threads by lifting the warps above the needles when the second length of yarn passes through the middle of the stitch.

9. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, and a safety-bar carried by the front carriage for bringing down the needle-threads below the needles for the purpose of preventing the latter from leaving the clips when tension is placed upon the stitch formed.

10. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, a beam-carrying frame having a lateral movement, a jointed lever, and a cam guiding the frame.

11. In a loom for the mechanical manufacture of knot-stitch carpets, the combination of needles for the passage of the pile-threads of the carpet between the threads forming the ground-warps, said needles having two points, clips by means of which said needles are successively conducted from the front toward the back and from the back toward the front through the warps, carriages upon which said clips are mounted, a fixed frame over which said carriages move, the frame which carries the ground warp-threads being moved successively the space of two threads or two intervals according to the path which the needle is to take with relation to the fabric, a bar having two rows of exactly-superposed holes, the said bar serving to guide the needles, means whereby it may be caused to rise or descend at intervals between two rows of holes in order to prevent the needles in their return movement to the middle of the two warp-threads forming the stitch, from piercing the length of pile-thread already engaged between the two ground warp-threads, a counter-slay guiding the pile warp-threads below the passage of the needles, means whereby it may be caused to retire, together with said perforated bar, when the locking of the stitch upon the face of the fabric takes place, a main shaft, a ratchet and pawl actuated by the workman for operating said shaft at every operation or stage in the formation of the stitch, and cams on said shaft arranged to actuate said perforated bar and counter-slay.

In testimony whereof I have signed this specification in the presence of two subscribing witnesses.

FERNAND BOYER.

Witnesses:
JULES ARMENGAUD, Jeune,
RENÉ ARMENGAUD.